United States Patent
Browning

(10) Patent No.: US 6,327,082 B1
(45) Date of Patent: Dec. 4, 2001

(54) WEDGE-SHAPED MOLDING FOR A FRAME OF AN IMAGE PROJECTION SCREEN

(75) Inventor: Gary Allan Browning, Long Beach, CA (US)

(73) Assignee: Stewart Filmscreen Corporation, Torrance, CA (US)

( * ) Notice: Subject to any disclaimer, the term of this patent is extended or adjusted under 35 U.S.C. 154(b) by 0 days.

(21) Appl. No.: 09/327,878

(22) Filed: Jun. 8, 1999

(51) Int. Cl.$^7$ .............................. G03B 21/56; H04N 5/64; F16M 11/00

(52) U.S. Cl. .................... 359/443; 359/449; 348/840; 248/200

(58) Field of Search .................................. 359/443, 449, 359/460; 248/188.2, 200, 201; 348/789, 825, 826, 840

(56) References Cited

U.S. PATENT DOCUMENTS

| | | | |
|---|---|---|---|
| 4,668,046 | * 5/1987 | Yatabe et al. ......................... | 359/457 |
| 4,895,429 | * 1/1990 | Iwahara et al. ....................... | 359/460 |
| 5,299,017 | * 3/1994 | Furuno ................................. | 348/786 |
| 5,580,145 | * 12/1996 | Yamada et al. ....................... | 353/74 |
| 5,604,632 | * 2/1997 | Sawai .................................. | 359/443 |
| 5,818,639 | * 10/1998 | Furuya ................................. | 359/455 |
| 6,000,668 | 12/1999 | Mannick .............................. | 248/201 |
| 6,081,375 | * 6/2000 | Furuya et al. ........................ | 359/460 |

* cited by examiner

Primary Examiner—Christopher E. Mahoney
(74) Attorney, Agent, or Firm—Koda & Androlia

(57) ABSTRACT

A molding for a frame for an image projection screen. The molding is wedge-shaped in cross section and a narrowest end of the wedge shape is for engaging with the back surface of the image projection screen. A surface of the molding adjacent the narrowest end includes an attachment surface for a adhesively bonding the image projection screen thereto; while the widest end of the wedge shape includes structure for coupling at least two moldings together.

5 Claims, 7 Drawing Sheets

WEDGE-SHAPED MOLDING FOR A FRAME OF AN IMAGE PROJECTION SCREEN

BACKGROUND OF THE INVENTION

1. Field of the Invention

The present invention relates to moldings and particularly to moldings used for making a frame to support a screen upon which an image is projected.

2. Prior Art

In the prior art there exist moldings to form a frame to support an image projection screen. These moldings are generally rectangular or square in cross section. As a result of their shape, they have several disadvantages as described herein below.

Since they are generally wide and the image projection screen is stretched over a wide portion of the prior art moldings, the molding covers a significant area around the periphery of the projection screen. As a result, it is difficult to manufacture screens in a modular manner since if you were to assemble two or more screens together, the wide areas where the moldings exist can block or distort the image, particularly when rear projection is being utilized. Still further, the flat surfaces tend to scatter any light which hits them as a result of overscan from the projector, resulting in unwanted stray light from the projected image. Still further, since the prior art moldings cannot be arranged in a modular fashion without deterioration of the image projected, the prior art screens are generally limited to a flat surface.

In an attempt to minimize the blocking of the image problem in the prior art, smaller moldings have been used. However, these smaller moldings often fail to sufficiently hold the screen in place due to wind and/or shrinkage of the screen due to thermal contraction.

SUMMARY OF THE INVENTION

Accordingly, it is a general object of the present invention to provide a molding for a frame for an image projecting screen which overcomes the disadvantages of the prior art.

In particular, it is an object of the present invention to provide a molding for a frame for an image projection screen which is modular in construction and the individual screen elements supported by the frame can be joined together to form overall larger displays or displays of curved shape without any apparent divisions between the individual screen elements.

It is still another object of the present invention to provide a molding for a frame which provides sufficient strength to firmly hold the screen while minimizing the blockage of the image.

It is yet another object of the present invention to provide a molding for a frame which absorbs unwanted stray light and is suitable for rear projection.

In keeping with the principles of the present invention, the objects are accomplished by a unique molding for a frame for an image projection screen wherein the molding is wedge-shaped in cross section with the narrowest of the wedge shape engaging with a rear surface of the image projection screen. A surface of the molding adjacent the narrowest end includes an attachment surface for the image projection screen and the widest end of the wedge shape includes means for coupling at least two moldings together. The attachment surface of the molding is connected to the image projection screen by means of a transparent adhesive ribbon which can be easily and quickly applied.

DETAILED DESCRIPTION OF THE DRAWINGS

The above-mentioned issues and objects of the present invention will become apparent with reference to the following description taken in conjunction with the attached drawings wherein like reference numerals are given like numbers and in which.

DETAILED DESCRIPTION OF THE INVENTION

Figure 1:
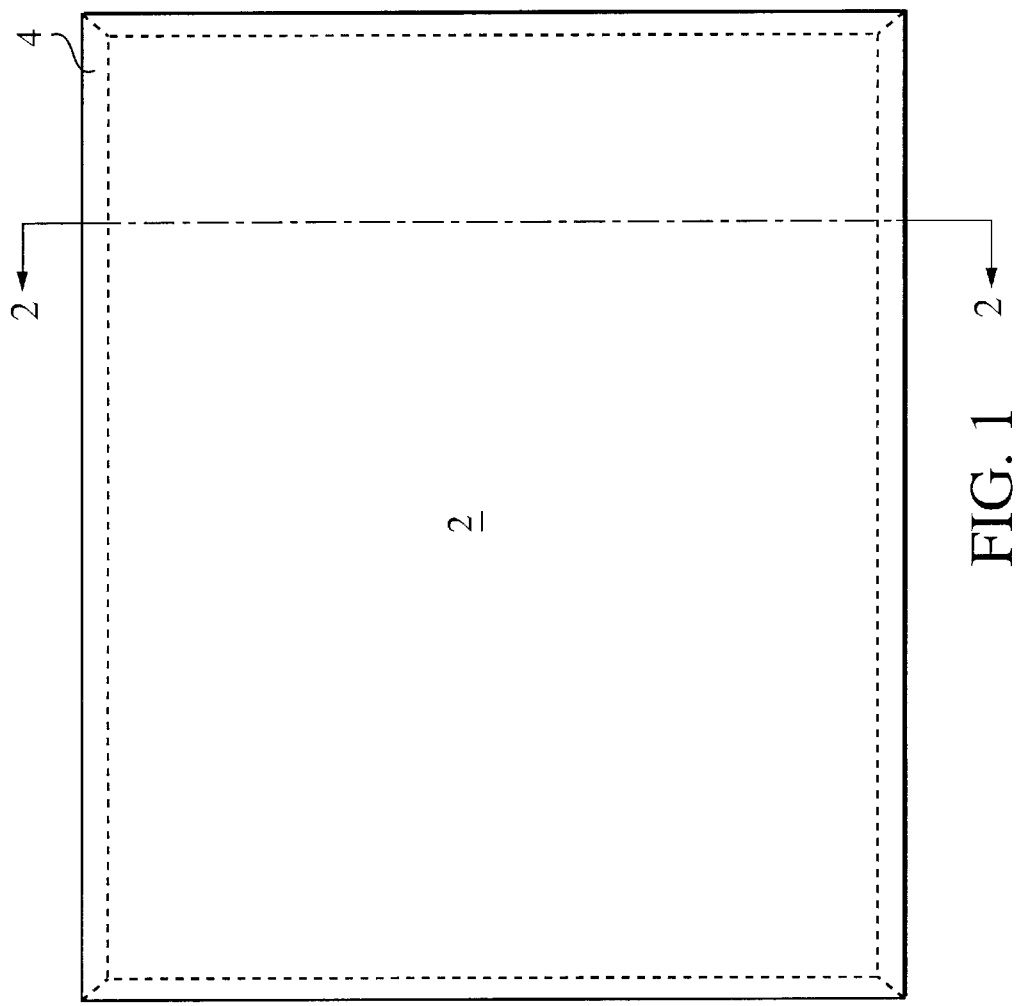
FIG. 1 is a front view of an image projection screen utilizing the molding of the present invention.
Figure 2:
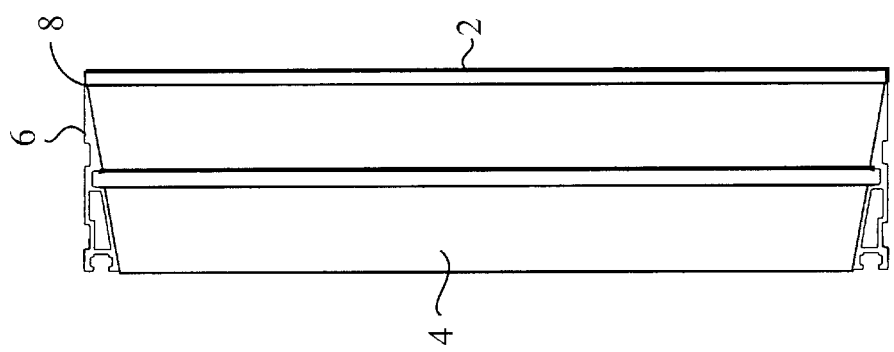
FIG. 2 is a cross section of FIG. 1 along the line 2—2 illustrating the molding of the present invention.
Figure 3:
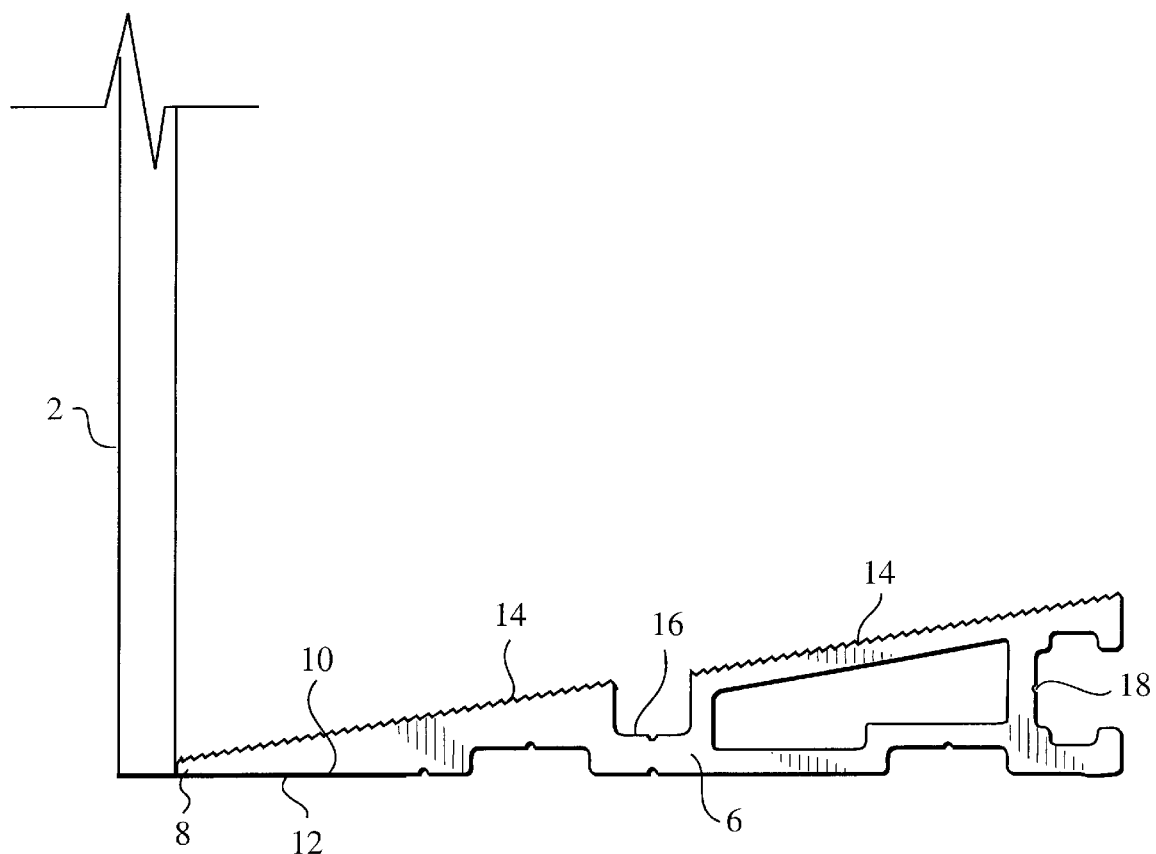
FIG. 3 is an enlarged portion of FIG. 2 illustrating the molding of the present invention.

Referring to FIGS. 1 through 4, shown therein is a molding for a frame for an image projection screen in accordance with the teachings of the present invention. In particular, shown in FIG. 1 is a front view of an image projection screen 2 supported on a rectangular frame 4. The rectangular frame 4 extends about the periphery of the image projection screen 2 and supports and maintains the shape of the image projection screen 2. As can be seen in FIG. 2, a cross section of FIG. 1, the frame 4 is generally made from a molding 6 which is of a generally wedge shape cross section. The thinnest end 8 of the molding 6 engages with the back surface of the image projection screen 2. The image projection screen 2 is easily coupled or connected to an attachment surface 10 adjacent the thin end 8 by means of a clear plastic adhesive ribbon 12 which is connected to the edges of the image projection screen 2 and then bonded by the adhesive to the attachment surface 10 of the molding 6. The inside face of the molding 6 is provided with fine grooved ridges 14 to act as a light trap for overscan from the image projector so as to absorb unwanted stray light. The angle 15 between the mounting edge 13 and the mating edge 11 of the molding 6 is at an angle slightly greater than 90°. This angle 15 assists in the assembly as is described later.

Figure 4:
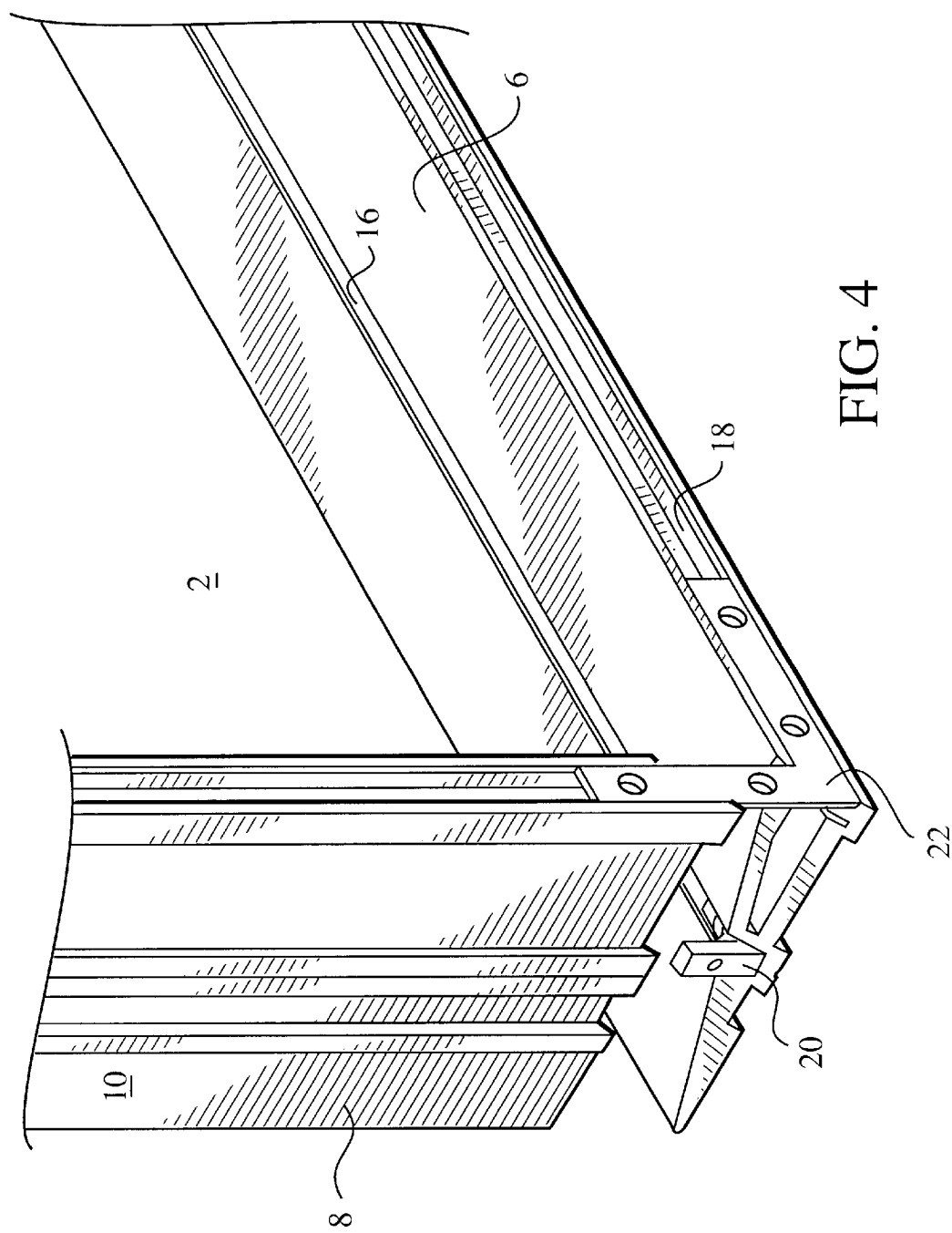
FIG. 4 is a partially disassembled partial view of FIG. 1.

The molding 6 is further provided with mounting channels 16 and 18. As is shown in FIG. 4, when a rectangular frame 4 such as is used in FIG. 1 is desired to be made from the molding 6, the ends of the molding 6 are cut at a 45° angle and right angle mounting brackets 20 and 22 are inserted and mounted into the mounting channels 16 and 18. In this way, a completed image projection screen supported by a frame 4 such as shown in FIG. 1 can be constructed.

Still further, it should be apparent to those skilled in the art that the molding could be extruded or machined from any suitable metal or plastic such as aluminum 6061 and provided with dull black finish such as a black anodized finish to minimize light reflection and provide a durable surface. Also, the clear plastic ribbon with adhesive 12 could be selected from a number of clear plastic adhesive tapes having a thickness less than 0.020 inches such as VHB tape.

Figure 5:
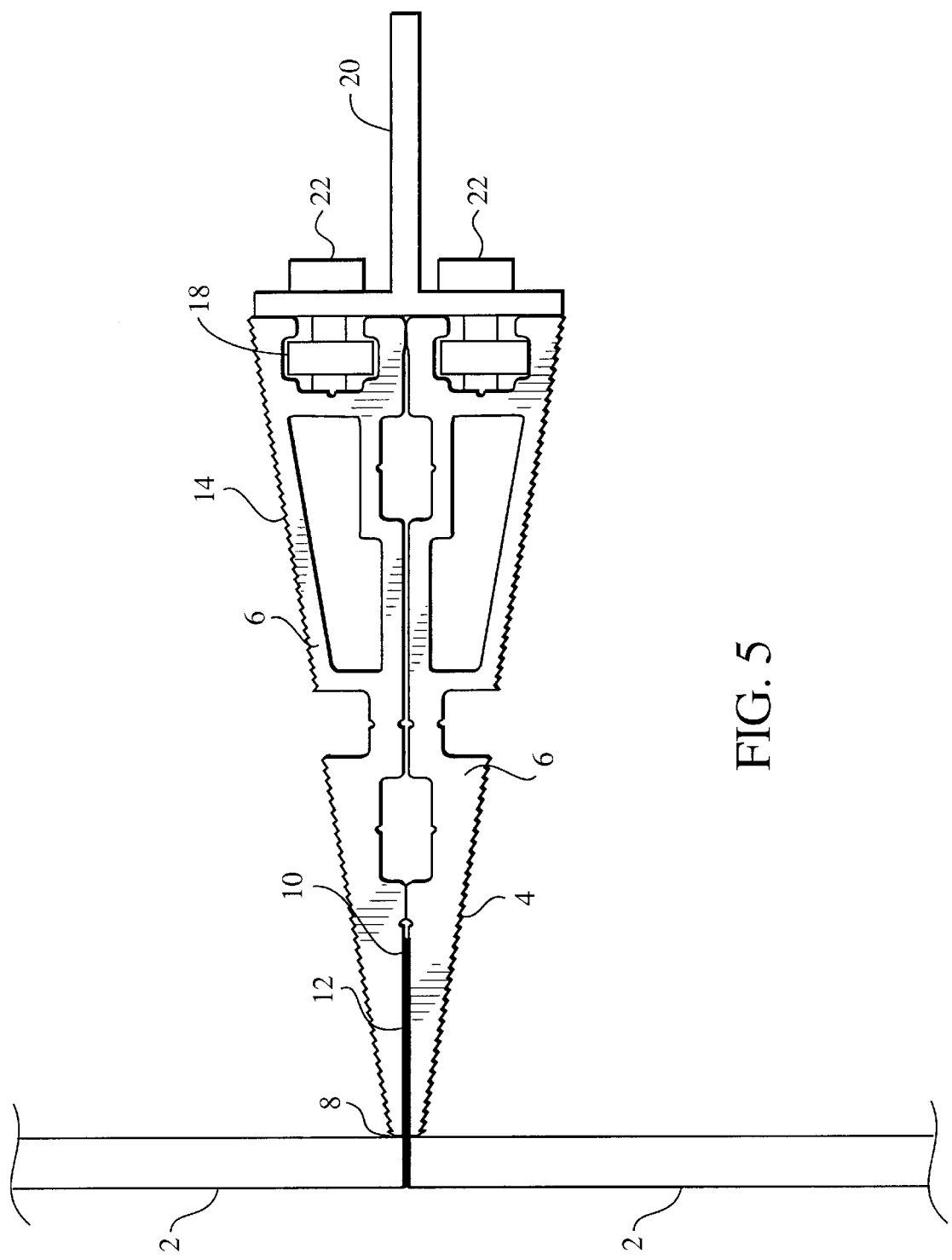
FIG. 5 is a view illustrating two molding coupled together back to back to form a screen from multiple screen elements.

Referring to FIG. 5, shown therein is the condition wherein it is desirable to assemble multiple image projection screens supported by a frame into a larger structure for projecting even larger images onto the screen. In such a structure, the image projection screens supported by a frame are connected together by way of T-shaped brackets 20 and mounting bolt and nut combinations 22 which fit into the mounting channel 18. Since the mounting surface of the T-shaped bracket 20 is substantially flat and the angle 15 is slightly greater than 90°, as the bolts 22 are tightened, the narrow ends of the moldings 6 are pressed together to press the ribbon 12 along the screen edges and keep the edges tightly together. By means of the T-shaped bracket 20, two moldings 6 may be tightly and closely mounted together. Also and as is shown in FIG. 5, the attachment surface 10 may be milled to make the end portion of the molding 6 slightly thinner by an amount equal to substantially the thickness of the tape 12.

Figure 6:
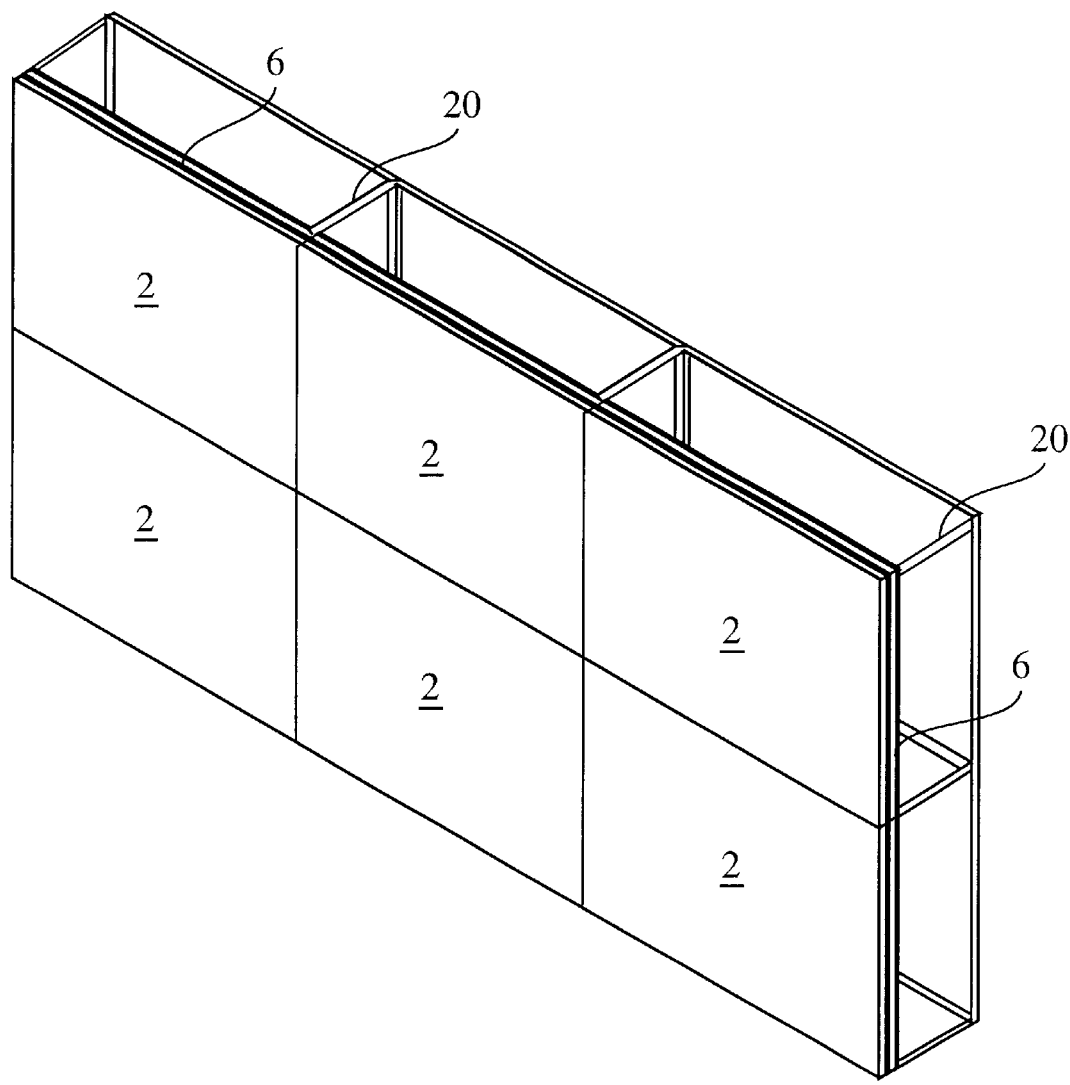
FIG. 6 is a modular enlarged screen made up of smaller screen elements utilizing the present invention.

Utilizing the construction of FIG. 5, a plurality of image projection screens similar to that shown in FIG. 1 can be assembled into a larger screen as is shown in FIG. 6. As is firther apparent from FIGS. 5 and 6, by using the molding of the present invention and the clear plastic tape, it allows a plurality of image projection screens supported by the molding of the present invention to be assembled together to form an overall larger display without any apparent or visible divisions between the screens.

Figure 7:
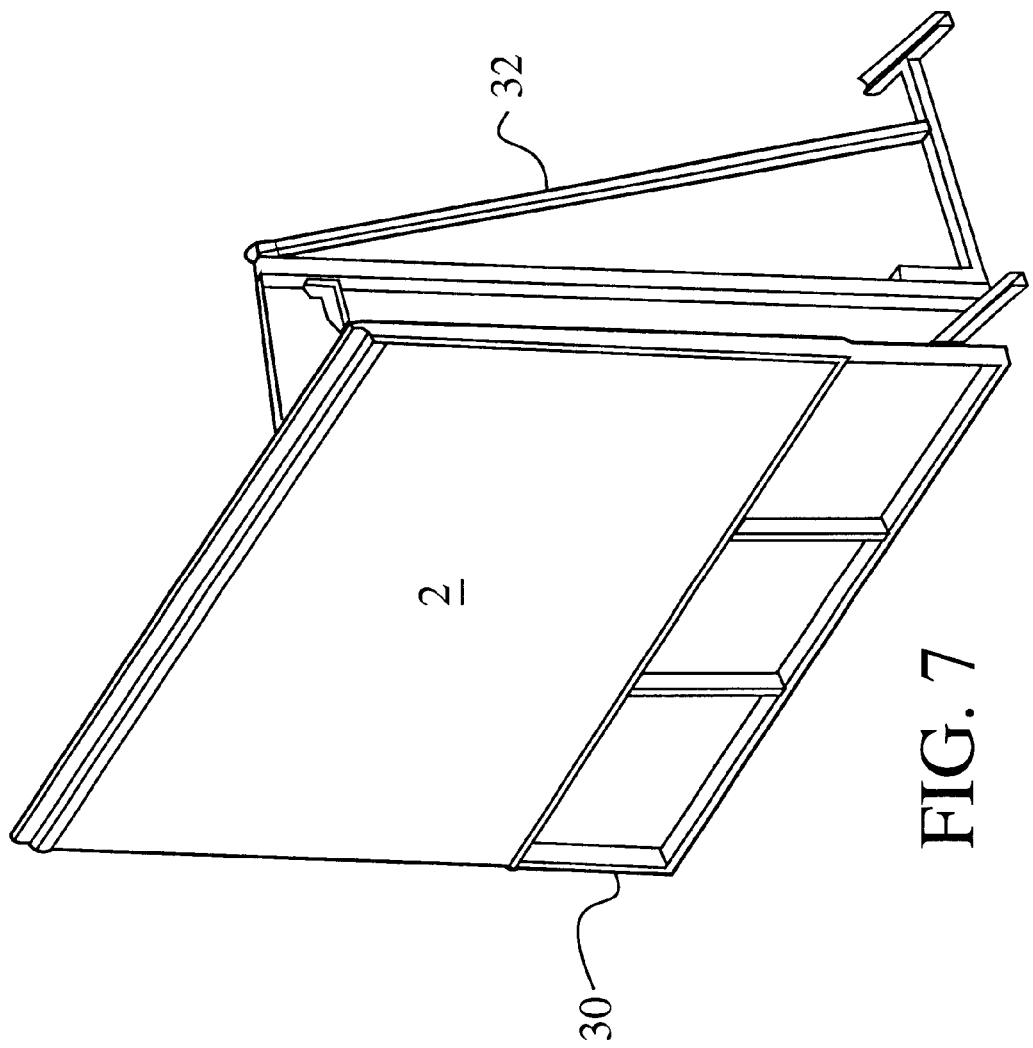
FIG. 7 is a isometric view illustrating a support and screen of the present invention.
Figure 8:
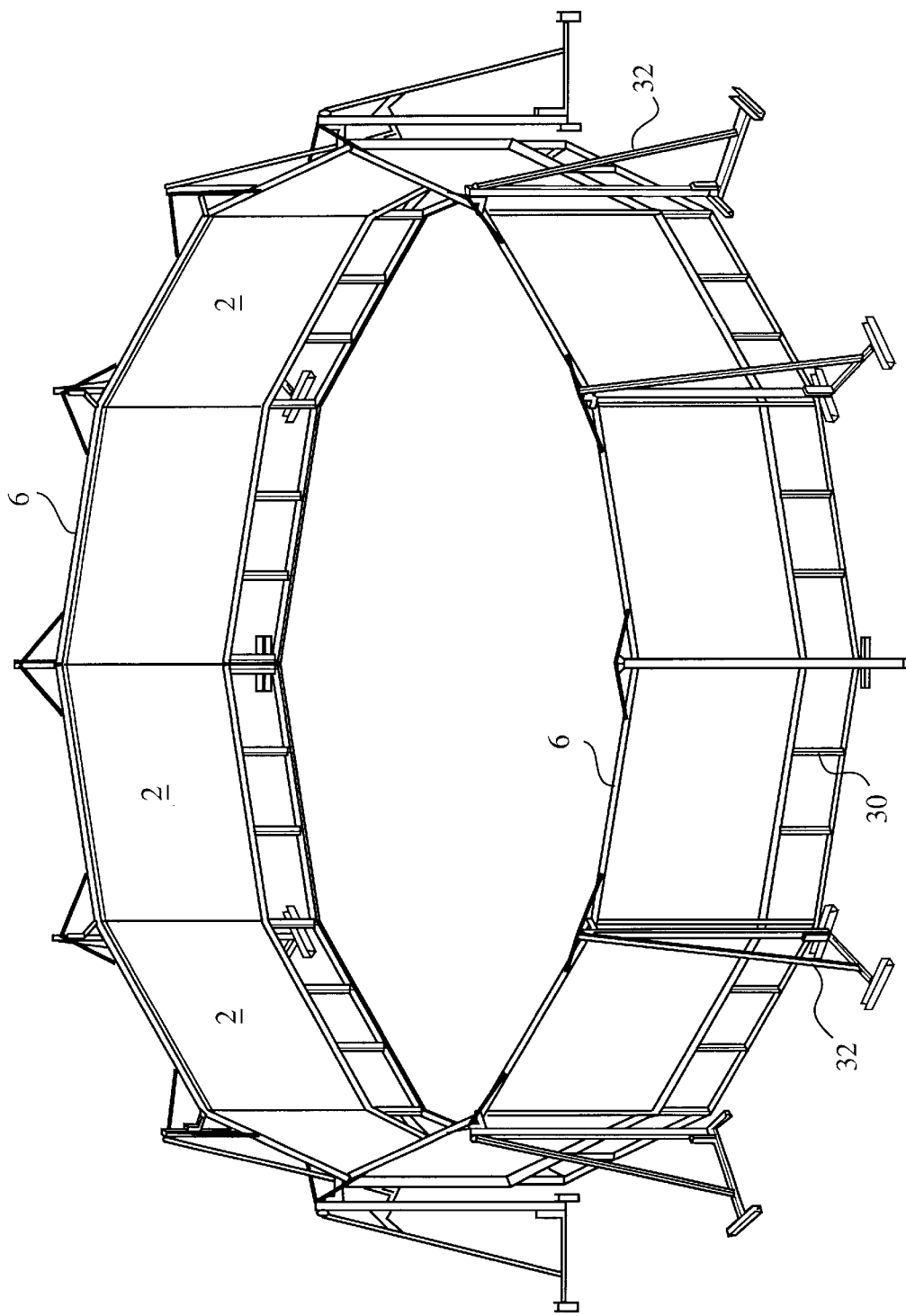
FIG. 8 illustrates a plurality of the screens and supports of FIG. 8 assembled into a circular screen.

Referring to FIGS. 7 and 8, shown therein is a structure wherein it is desirable to assemble a screen in the round. As is shown in FIG. 8, a plurality of rectangular image projection screens supported by a molding of the present invention such as shown in FIG. 1 are supported on structures such as shown in FIG. 7 and then assembled together into a screen in the round as shown in FIG. 8. As is clear from FIG. 7, the rectangular screen is first provided on a ladder-shaped support frame 30 and then supported from the rear by a vertically extending triangular supporting structure 32 adjacent the top edge corner. These completed units are then placed side by side into a circle as is shown in FIG. 8.

It should be apparent to those skilled in the art that the above-described embodiments are merely illustrative of but one embodiment of the present invention. Numerous and varied other arrangements can be readily provided by those skilled in the art without departing from the spirit and scope of the invention.

I claim:

1. A molding for a frame for an image projection screen, wherein:

said molding is wedge shaped in cross section;

said wedge shape comprises a substantially first flat surface at a widest portion of said wedge shape and having first and second edges, a second flat surface extending from said second edge of said first flat surface toward a narrowest end of said wedge shape and a third surface extending from said narrowest end to said second edge of said first flat surface;

said narrowest end of said wedge shape is for engaging with said image projection screen;

a portion of said second flat surface of said molding which is adjacent said narrowest end comprises an attachment surface for coupling said image projection screen to said molding with an adhesive tape;

said first flat surface of said wedge shape comprises means for mounting at least two moldings together; and an angle between said first and second flat surfaces is slightly greater than 90° whereby when said two moldings are mounted adjacent each other with said second flat surfaces of each molding adjacent each other, said attachment surfaces of said two moldings are pressed together to hold said image projection screen tightly.

2. A molding according to claim 1, wherein an inside face of said molding is provided with fine groove ridges to act as a light trap to absorb unwanted stray light.

3. A molding according to claim 2, wherein said molding is made from aluminum.

4. A molding for a frame according to claim 2, wherein said coupling means comprises a channel.

5. A molding according to claim 2, wherein said molding is made from plastic.

\* \* \* \* \*